United States Patent
Ebihara

(10) Patent No.: US 11,488,415 B2
(45) Date of Patent: Nov. 1, 2022

(54) THREE-DIMENSIONAL FACIAL SHAPE ESTIMATING DEVICE, THREE-DIMENSIONAL FACIAL SHAPE ESTIMATING METHOD, AND NON-TRANSITORY COMPUTER-READABLE MEDIUM

(71) Applicant: NEC Corporation, Tokyo (JP)

(72) Inventor: Akinori Ebihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 46 days.

(21) Appl. No.: 16/755,983

(22) PCT Filed: Oct. 18, 2018

(86) PCT No.: PCT/JP2018/038898
§ 371 (c)(1),
(2) Date: Apr. 14, 2020

(87) PCT Pub. No.: WO2019/078310
PCT Pub. Date: Apr. 25, 2019

(65) Prior Publication Data
US 2020/0257888 A1    Aug. 13, 2020

(30) Foreign Application Priority Data
Oct. 20, 2017  (JP) .............................. JP2017-203669

(51) Int. Cl.
*G06V 40/16*    (2022.01)
*G06T 7/55*     (2017.01)
*H04N 5/232*    (2006.01)

(52) U.S. Cl.
CPC .............. *G06V 40/165* (2022.01); *G06T 7/55* (2017.01); *G06V 40/167* (2022.01); *H04N 5/23219* (2013.01)

(58) Field of Classification Search
None
See application file for complete search history.

(56) References Cited

U.S. PATENT DOCUMENTS 8,259,161 B1 *   9/2012  Huang ................... G03B 35/02
                                                                 348/50
9,424,461 B1 *   8/2016  Yuan .................. G06K 9/00214
(Continued)

FOREIGN PATENT DOCUMENTS

JP      2003-115052 A     4/2003
JP      2010-140283 A     6/2010
(Continued)

OTHER PUBLICATIONS

Piotraschke, Marcel, and Volker Blanz. "Automated 3d face reconstruction from multiple images using quality measures." Proceedings of the IEEE Conference on Computer Vision and Pattern Recognition. 2016. (Year: 2016).*

(Continued)

*Primary Examiner* — Michelle M Entezari
(74) *Attorney, Agent, or Firm* — Sughrue Mion, PLLC

(57) ABSTRACT

A three-dimensional facial shape estimating device (300) includes a face image acquiring unit (301) configured to acquire a plurality of image frames that capture a subject's face; a face information acquiring unit (302) having, preset therein, a predetermined number of facial feature points, the face information acquiring unit (302) being configured to acquire, for each of the plurality of image frames, face information that indicates a position of each of the predetermined number of facial feature points of the subject's face within the image frame; and a three-dimensional shape estimating unit (303) configured to perform mapping of each of the predetermined number of facial feature points of the subject's face between the plurality of image frames based on the face information of each of the plurality of image (Continued)

frames and to estimate the three-dimensional shape of the subject's face based on a result from the mapping.

8 Claims, 7 Drawing Sheets

(56) References Cited

U.S. PATENT DOCUMENTS

| | | | | |
|---|---|---|---|---|
| 2004/0051783 | A1* | 3/2004 | Chellappa | H04N 13/261 348/46 |
| 2008/0226148 | A1* | 9/2008 | Gu | G06T 7/0002 382/128 |
| 2010/0172567 | A1* | 7/2010 | Prokoski | A61B 5/418 382/132 |
| 2011/0058743 | A1* | 3/2011 | Myers | G06V 40/16 382/218 |
| 2011/0123071 | A1* | 5/2011 | Shah | G06K 9/6219 382/118 |
| 2011/0274361 | A1* | 11/2011 | Bovik | G06V 20/10 382/224 |
| 2013/0070973 | A1 | 3/2013 | Saito et al. | |
| 2015/0009214 | A1* | 1/2015 | Lee | G06T 17/20 345/420 |
| 2015/0035825 | A1* | 2/2015 | Zhou | G06T 13/40 345/419 |
| 2016/0048978 | A1 | 2/2016 | Jachalsky et al. | |
| 2016/0261853 | A1 | 9/2016 | Surkov | |
| 2017/0119298 | A1* | 5/2017 | Cheung | G06K 9/00248 |
| 2018/0082416 | A1* | 3/2018 | Arulesan | H04N 5/23293 |
| 2019/0108677 | A1* | 4/2019 | Blondel | G06K 9/00 |

FOREIGN PATENT DOCUMENTS

| | | |
|---|---|---|
| JP | 5087037 B2 | 11/2012 |
| JP | 2013-065119 A | 4/2013 |
| JP | 2015-210677 A | 11/2015 |

OTHER PUBLICATIONS

Chowdhury, A. Roy, Rama Chellappa, Sandeep Krishnamurthy, and Tai Vo. "3D face reconstruction from video using a generic model." In Proceedings. IEEE International Conference on Multimedia and Expo, vol. 1, pp. 449-452. IEEE, 2002. (Year: 2002).*

Moorthy AK, Bovik AC. A two-step framework for constructing blind image quality indices. IEEE Signal processing letters. Mar. 18, 2010;17(5):513-6. (Year: 2010).*

Zakrewsky S, Aryafar K, Shokoufandeh A. Item popularity prediction in e-commerce using image quality feature vectors. arXiv preprint arXiv: 1605.03663. May 12, 2016. (Year: 2016).*

Jahanbin S, Choi H, Jahanbin R, Bovik AC. Automated facial feature detection and face recognition using Gabor features on range and portrait images. In2008 15th IEEE International Conference on Image Processing Oct. 12, 2008 (pp. 2768-2771). IEEE. (Year: 2008).*

Hjelmas, E. "Feature-based face recognition." NOBIM Proceedings (Norwegian Image Processing and Pattern Recognition Conference). 2000. (Year: 2000).*

Sellahewa H, Jassim SA. Image-quality-based adaptive face recognition. IEEE Transactions on Instrumentation and measurement. Mar. 4, 2010;59(4):805-13. (Year: 2010).*

Extended European Search Report for EP Application No. EP18869108.3 dated Nov. 9, 2020.

Baumberger Christian et al., "3D Face Reconstruction from Video Using 3D Morphable Model and Silhouette", 2014 27th SIBGRAPI Conference on Graphics, Patterns and Images, IEEE, Aug. 26, 2014, pp. 1-8.

Unsang Park et al., "3D Model-Based Face Recognition in Video", Advances in Biometrics, International Conference, ICB 2007, Aug. 27, 2007, pp. 1084-1094.

Chengchao Qu et al. "Fast, robust and automatic 3D face model reconstruction from videos", 2014 11th IEEE International Conference on Advanced Video and Signal Based Surveillance, IEEE, Aug. 26, 2014, pp. 113-118.

International Search Report for PCT Application No. PCT/JP2018/038898, dated Nov. 20, 2018.

* cited by examiner

THREE-DIMENSIONAL FACIAL SHAPE ESTIMATING DEVICE, THREE-DIMENSIONAL FACIAL SHAPE ESTIMATING METHOD, AND NON-TRANSITORY COMPUTER-READABLE MEDIUM

This application is a National Stage Entry of PCT/JP2018/038898 filed on Oct. 18, 2018, which claims priority from Japanese Patent Application 2017-203669 filed on Oct. 20, 2017, the contents of all of which are incorporated herein by reference, in their entirety.

TECHNICAL FIELD

The present disclosure relates to a technique for estimating a three-dimensional shape of a subject's face from a plurality of image frames that capture the subject's face.

BACKGROUND ART

There are some conceivable methods for estimating, from an image frame that is two-dimensional plane data, a three-dimensional shape of a subject's face captured in that image frame. In one example method, a plurality of image frames (a plurality of time-series image frames, a plurality of image frames captured from a plurality of different viewpoints, etc.) that capture a subject's face are acquired, facial feature points of the subject's face are mapped between the plurality of image frames, and a three-dimensional shape of the subject's face is estimated based on the result from the mapping. This method requires an operation of mapping the facial feature points of the subject between the plurality of image frames. Patent Literatures 1 to 3 listed below, for example, describe related techniques for mapping feature points of a target subject, such as a face, between a plurality of image frames.

In the related technique described in Patent Literature 1, to track feature points in time-series images, feature points in a preceding image frame are mapped to feature points in a current image frame. Specifically, in the related technique described in Patent Literature 1, the similarity between a rectangular region centered on a feature point in a preceding image frame and a rectangular region centered on a candidate feature point in a current image frame is calculated (matching processing is performed), and the candidate feature point, among the candidate feature points in the current image frame, that has a high similarity is mapped to the feature point in the preceding image frame.

In the related technique described in Patent Literature 2, temporally adjacent image frames are extracted from a captured image, a face region is detected in each of the adjacent image frames, and the pixels in the face regions are mapped between the adjacent image frames. The mapping employs a method for calculating optical flow. Optical flow is a two-dimensional vector that expresses the direction and the amount of a movement of a pixel from a given frame to the next image frame. In the related technique described in Patent Literature 2, the optical flow of each pixel is calculated in the face regions, and the pixels in the face regions are mapped between the adjacent image frames with the use of the calculated optical flow. Furthermore, in order to eliminate any influence of an error in the mapping of the pixels, any outlier in the optical flow is removed.

In the related technique described in Patent Literature 3, a BRIEF descriptor is generated for a feature point through a BRIEF algorithm, and feature points are mapped based on the BRIEF descriptors. In the BRIEF algorithm, two points around a feature point are extracted at random, and processing of comparing the brightness of the two points is repeated. A descriptor that describes the feature point in a binary string representing the result of the comparisons serves as the BRIEF descriptor.

CITATION LIST

Patent Literature

Patent Literature 1: Japanese Unexamined Patent Application Publication No. 2003-115052
Patent Literature 2: Japanese Patent No. 5087037
Patent Literature 3: Japanese Unexamined Patent Application Publication No. 2015-210677

SUMMARY OF INVENTION

Technical Problem

As described above, estimating a three-dimensional shape of a subject's face from a plurality of image frames that capture the subject's face requires an operation of mapping the facial feature points of the subject's face between the plurality of image frames. At this point, if wrong facial feature points are mapped between the plurality of image frames, it becomes difficult to estimate an accurate three-dimensional shape. Therefore, the facial feature points need to be accurately mapped one-to-one between the plurality of image frames.

However, in the related technique described in Patent Literature 1, since rectangular regions centered on feature points are matched between a plurality of image frames, feature points in a preceding image frame and feature points in a current image frame may be in one-to-many relationship or many-to-one relationship in some cases. In this case, achieving one-to-one mapping of the feature points between the plurality of image frames requires such processing as calculating and/or comparing similarities, and this leads to a problem of complicating the processing for mapping the feature points between the plurality of image frames.

In the related technique described in Patent Literature 2, the optical flow of each pixel is calculated in the face regions, and the pixels in the face regions are mapped between the adjacent image frames with the use of the calculated optical flow. However, the optical flow includes an outlier as well, and processing of removing this outlier is required in order to eliminate any influence of an error in mapping. Therefore, there arises a problem of complicating the processing for mapping the feature points between the plurality of image frames.

In the related technique described in Patent Literature 3, since the number of feature points in one image frame is not fixed, the number of feature points in a preceding image frame does not necessarily match the number of feature points in a current image frame. Therefore, there is a problem in that the feature points may not be mapped one-to-one between the plurality of image frames in some cases. In the related technique described in Patent Literature 1, the number of feature points in one image frame is not fixed, either. Therefore, feature points in a preceding image frame and feature points in a current image frame may be in one-to-many relationship or many-to-one relationship in some cases, as described above.

The present disclosure is directed to solve the above shortcomings and to provide a technique that makes it possible to map facial feature points of a face between a plurality of image frames more easily and more accurately.

Solution to Problem

According to one aspect of the present disclosure, a three-dimensional facial shape estimating device includes a face image acquiring unit configured to acquire a plurality of image frames that capture a subject's face;

a face information acquiring unit having, preset therein, a predetermined number of facial feature points necessary for estimating a three-dimensional shape of the subject's face, the face information acquiring unit being configured to acquire, for each of the plurality of image frames, face information that indicates a position of each of the predetermined number of facial feature points of the subject's face within the image frame; and a three-dimensional shape estimating unit configured to perform mapping of each of the predetermined number of facial feature points of the subject's face between the plurality of image frames based on the face information of each of the plurality of image frames and to estimate the three-dimensional shape of the subject's face based on a result from the mapping.

According to an aspect of the present disclosure, a three-dimensional facial shape estimating method is performed by a three-dimensional facial shape estimating device, and the three-dimensional facial shape estimating method includes a face image acquiring step of acquiring a plurality of image frames that capture a subject's face;

a face information acquiring step of, with a predetermined number of facial feature points necessary for estimating a three-dimensional shape of the subject's face preset, acquiring, for each of the plurality of image frames, face information that indicates a position of each of the predetermined number of facial feature points of the subject's face within the image frame; and a three-dimensional shape estimating step of performing mapping of each of the predetermined number of facial feature points of the subject's face between the plurality of image frames based on the face information of each of the plurality of image frames and estimating the three-dimensional shape of the subject's face based on a result from the mapping.

According to an aspect of the present disclosure, a non-transitory computer-readable medium stores a three-dimensional facial shape estimating program for causing a computer to execute:

a face image acquiring procedure of acquiring a plurality of image frames that capture a subject's face;

a face information acquiring procedure of, with a predetermined number of facial feature points necessary for estimating a three-dimensional shape of the subject's face preset, acquiring, for each of the plurality of image frames, face information that indicates a position of each of the predetermined number of facial feature points of the subject's face within the image frame; and a three-dimensional shape estimating procedure of performing mapping of each of the predetermined number of facial feature points of the subject's face between the plurality of image frames based on the face information of each of the plurality of image frames and estimating the three-dimensional shape of the subject's face based on a result from the mapping.

Advantageous Effects of Invention

The present disclosure provides an advantageous effect of making it possible to map facial feature points of a face between a plurality of image frames more easily and more accurately.

DESCRIPTION OF EMBODIMENTS

<Overview of the Present Disclosure>

Prior to describing example embodiments of the present disclosure, an overview of the present disclosure will be given.

As described above, estimating a three-dimensional shape of a subject's face from a plurality of image frames that capture the subject's face requires an operation of mapping facial feature points of the subject's face between the plurality of image frames. At this point, if wrong facial feature points are mapped between the plurality of image frames, it becomes difficult to estimate an accurate three-dimensional shape. Therefore, the facial feature points need to be accurately mapped one-to-one between the plurality of image frames.

Figure 1:
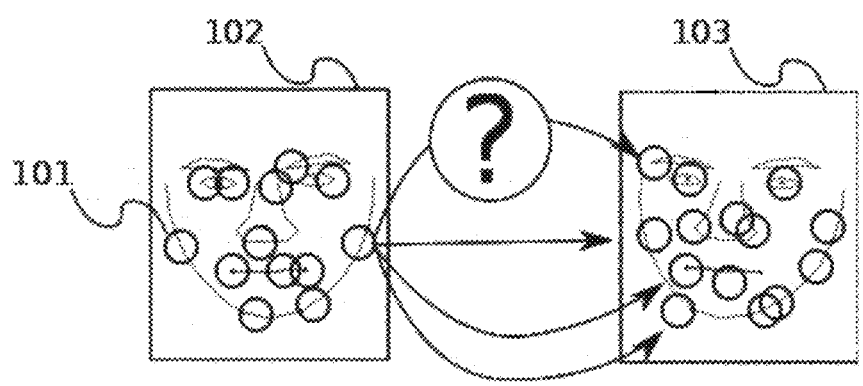
FIG. 1 illustrates an example of a method for mapping facial feature points between a plurality of image frames in a related technique.
Figure 2:
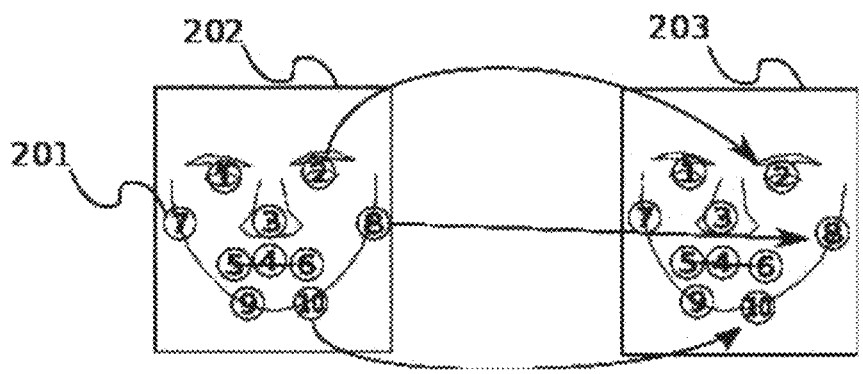
FIG. 2 illustrates an example of a method for mapping facial feature points between a plurality of image frames in the present disclosure.

Now, with reference to FIGS. 1 and 2, a method for mapping facial feature points between a plurality of image frames in the present disclosure will be described in comparison with a related technique. FIG. 1 illustrates an example of a method for mapping facial feature points between a plurality of image frames in a related technique. FIG. 2 illustrates an example of a method for mapping facial feature points between a plurality of image frames in the present disclosure.

In the related techniques described in Patent Literatures 1 to 3, the number of feature points in one image frame is not fixed. Therefore, as illustrated in FIG. 1, the number of facial feature points 101 in an image frame 102 and the number of facial feature points 101 in another image frame 103 may not match each other, and there is a problem in that the facial feature points 101 may fail to be mapped one-to-one between the image frames 102 and 103 in some cases. In this case, in the related technique described in Patent Literature 1, such processing as calculating and/or comparing similarities is performed in order to achieve one-to-one mapping of the facial feature points 101 between the image frames 102 and 103. This leads to a problem of complicating the processing for mapping the facial feature points 101 between the image frames 102 and 103.

In the related technique described in Patent Literature 2, the optical flow of each pixel is calculated in the face regions, and the pixels in the face regions are mapped between the adjacent image frames with the use of the calculated optical flow. However, eliminating any influence of an error in mapping requires processing of removing any outlier in the optical flow, and this leads to a problem of complicating the processing for mapping the feature points between the plurality of image frames.

In contrast, in the present disclosure, a predetermined number of (two or more) facial feature points 201 necessary for estimating a three-dimensional shape of a subject's face are preset, as illustrated in FIG. 2. In this example, ten facial feature points 201 (1. right eye, 2. left eye, 3. nose, 4. mouth center, 5. mouth right corner, 6. mouth left corner, 7. right cheek, 8. left cheek, 9. right chin, 10. left chin) are preset. Then, in the present disclosure, for each of image frames 202 and 203, face information (meta-information) indicating the position of each of the predetermined number of facial feature points 201 of the subject's face in the image frame is acquired.

Thus, the use of the face information of each of the image frames 202 and 203 makes it possible to uniquely identify which position in the image frame 202 corresponds to the right eye and which position in the image frame 203 corresponds to the right eye, for example. This makes it possible to uniquely map the right eyes in the respective image frames 202 and 203. This applies similarly to the facial feature points other than the right eye. In this case, no complicated processing is required for mapping. Accordingly, the facial feature points 201 can be mapped between the image frames 202 and 203 more easily and more accurately.

Some example embodiments of the present disclosure will be described below. In the following descriptions and drawings, omissions and simplifications are made as appropriate to make the descriptions clearer. In the drawings, identical elements are given identical reference characters, and their duplicate descriptions will be omitted as necessary. The specific numerical values and so on indicated in the following example embodiments are merely illustrative in nature to facilitate understanding of the disclosure and are not to limit the disclosure.

First Example Embodiment

Figure 3:
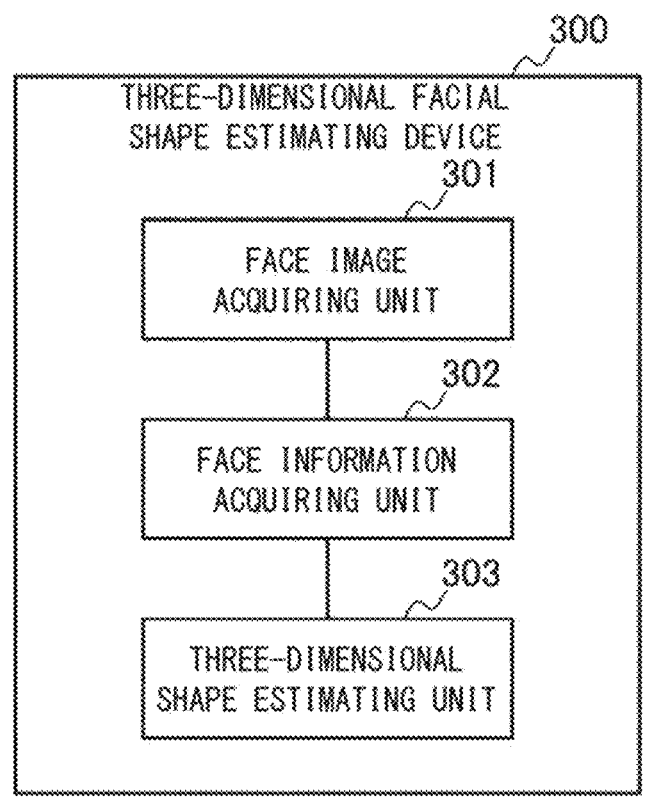
FIG. 3 is a functional block diagram illustrating an example of a functional block configuration of a three-dimensional facial shape estimating device according to a first example embodiment.

First, with reference to FIG. 3, a functional block configuration of a three-dimensional facial shape estimating device 300 according to a first example embodiment will be described. FIG. 3 is a functional block diagram illustrating an example of a functional block configuration of the three-dimensional facial shape estimating device 300 according to the first example embodiment.

As illustrated in FIG. 3, the three-dimensional facial shape estimating device 300 according to the first example embodiment includes a face image acquiring unit 301, a face information acquiring unit 302, and a three-dimensional shape estimating unit 303.

The face image acquiring unit 301 acquires a plurality of image frames that capture a subject's face and outputs the acquired plurality of image frames to the face information acquiring unit 302. The plurality of image frames that the face image acquiring unit 301 acquires may be, for example but not limited to, a plurality of time-series image frames or a plurality of image frames captured from a plurality of different viewpoints. The plurality of image frames may be a moving image or a still image. The face image acquiring unit 301 may be implemented by an image capturing device, such as a digital camera or a digital video camera, for example. The face image acquiring unit 301 may acquire an image frame captured by a user with the image capturing device. The user himself/herself may serve as a subject, or a person other than the user may serve as a subject.

In the face information acquiring unit 302, a predetermined number of facial feature points necessary for estimating a three-dimensional shape of a subject's face are preset. For example, ten facial feature points (1. right eye, 2. left eye, 3. nose, 4. mouth center, 5. mouth right corner, 6. mouth left corner, 7. right cheek, 8. left cheek, 9. right chin, 10. left chin) are preset in the face information acquiring unit 302.

Then, for each of the plurality of image frames acquired by the face image acquiring unit 301, the face information acquiring unit 302 acquires face information indicating the position of each of the predetermined number of facial feature points of the subject's face in the image frame. An example of the face information is summarized in Table 1.

TABLE 1

| FEATURE POINT NUMBER | POSITION IN FACE REGION | PIXEL POSITION IN IMAGE |
| --- | --- | --- |
| 1 | RIGHT EYE | $(x_1, y_1)$ |
| 2 | LEFT EYE | $(x_2, y_2)$ |
| 3 | NOSE | $(x_3, y_3)$ |
| 4 | MOUTH CENTER | $(x_4, y_4)$ |
| 5 | MOUTH RIGHT CORNER | $(x_5, y_5)$ |
| 6 | MOUTH LEFT CORNER | $(x_6, y_6)$ |
| 7 | RIGHT CHEEK | $(x_7, y_7)$ |
| 8 | LEFT CHEEK | $(x_8, y_8)$ |
| 9 | RIGHT CHIN | $(x_9, y_9)$ |
| 10 | LEFT CHIN | $(x_{10}, y_{10})$ |

The face information summarized in Table 1 includes, for a given image frame, information on the pixel position (x,y), within the image, of each of the ten preset facial feature points. The face information acquiring unit 302 acquires the face information summarized in Table 1 for each of the plurality of image frames acquired by the face image acquiring unit 301. Then, the face information acquiring unit 302 outputs, to the three-dimensional shape estimating unit 303, the plurality of image frames each having the face information added thereto.

Based on the face information, acquired by the face information acquiring unit 302, of each of the plurality of image frames, the three-dimensional shape estimating unit 303 maps each of the predetermined number of facial feature points of the subject's face between the plurality of image frames acquired by the face image acquiring unit 301 and estimates a three-dimensional shape of the subject's face based on the result from the mapping.

To be more specific, the three-dimensional shape estimating unit 303 determines a movement of the subject's face based on the result from the mapping of the facial feature points between the plurality of image frames and estimates the three-dimensional shape of the subject's face based on the movement of the subject's face. However, such an estimation method is well known and is not an essential feature of the present disclosure, and any desired well-known technique can be used.

Figure 4:
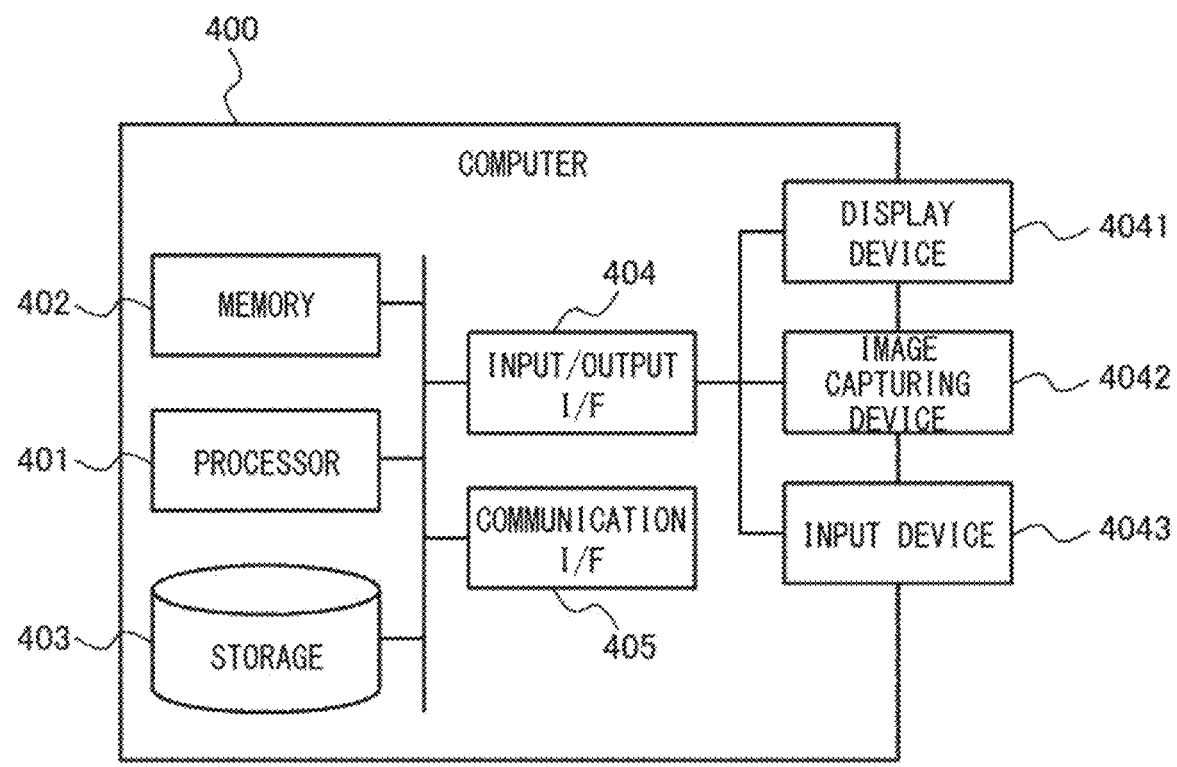
FIG. 4 is a hardware configuration diagram illustrating an example of a hardware configuration of a computer that implements a three-dimensional facial shape estimating device according to first and second example embodiments.

Next, with reference to FIG. 4, a hardware configuration of a computer 400 that implements the three-dimensional facial shape estimating device 300 according to the first example embodiment will be described. FIG. 4 is a hardware configuration diagram illustrating an example of a hardware configuration of the computer 400 that implements the three-dimensional facial shape estimating device 300 according to the first example embodiment. The computer 400 is presumably a portable computer, such as a mobile phone or a smartphone, for example.

As illustrated in FIG. 4, the computer 400 includes a processor 401, a memory 402, a storage 403, an input/output interface (input/output I/F) 404, and a communication interface (communication I/F) 405. The processor 401, the memory 402, the storage 403, the input/output interface 404, and the communication interface 405 are connected by a data transmission line for transmitting and receiving data therebetween.

The processor 401 is an arithmetic operation processing device, such as a central processing unit (CPU) or a graphics processing unit (GPU), for example. The memory 402 is a memory, such as a random-access memory (RAM) or a read-only memory (ROM), for example. The storage 403 is a storage device, such as a hard disk drive (HDD), a solid-state drive (SSD), or a memory card, for example.

The memory 402 or the storage 403 stores programs that implement the functions of the face information acquiring unit 302 and the three-dimensional shape estimating unit 303 of the three-dimensional facial shape estimating device 300. The processor 401 executes these programs to thus implement the respective functions of the face information acquiring unit 302 and the three-dimensional shape estimating unit 303. When the processor 401 executes the above programs, the processor 401 may execute the programs upon loading them onto the memory 402 or execute the programs without loading them onto the memory 402.

The above-described programs can be stored with the use of various types of non-transitory computer-readable media and supplied to the computer 400. The non-transitory computer readable media include various types of tangible recording media. Examples of the non-transitory computer-readable media include a magnetic recording medium (e.g., flexible disk, magnetic tape, hard disk drive), an optical magnetic recording medium (e.g., magneto-optical disk), a compact disc read-only memory (CD-ROM), a compact disc recordable (CD-R), a compact disc rewritable (CD-R/W), and a semiconductor memory (e.g., mask ROM, programmable ROM (PROM), erasable PROM (EPROM), flash ROM, RAM). The programs may also be supplied to the computer 400 in the form of various types of transitory computer-readable media. Examples of the transitory computer-readable media include an electric signal, an optical signal, and an electromagnetic wave. The transitory computer-readable media can supply the programs to the computer via a wired communication line, such as an electric wire or an optical fiber, or via a wireless communication line.

The input/output interface 404 is connected to, for example but not limited to, a display device 4041, an image capturing device 4042, and an input device 4043. The display device 4041 is a device, such as a liquid-crystal display (LCD) or a cathode-ray tube (CRT) display, that displays a screen corresponding to drawing data processed by the processor 401. The image capturing device 4042 is a device, such as a digital camera or a digital video camera, for the user to capture an image of a subject's face or the like. The image capturing device 4042 implements the function of the face image acquiring unit 301. The input device 4043 is a device that receives the user's operation input. The input device 4043 is, for example but not limited to, a keyboard and a touch sensor. The display device 4041 and the input device 4043 may be integrated and implemented in the form of a touch panel.

The communication interface 405 transmits and receives data to and from an external device. For example, the communication interface 405 communicates with an external device via a wired network or a wireless network.

The hardware configuration of the computer 400 is not limited to the configuration illustrated in FIG. 4.

Figure 5:
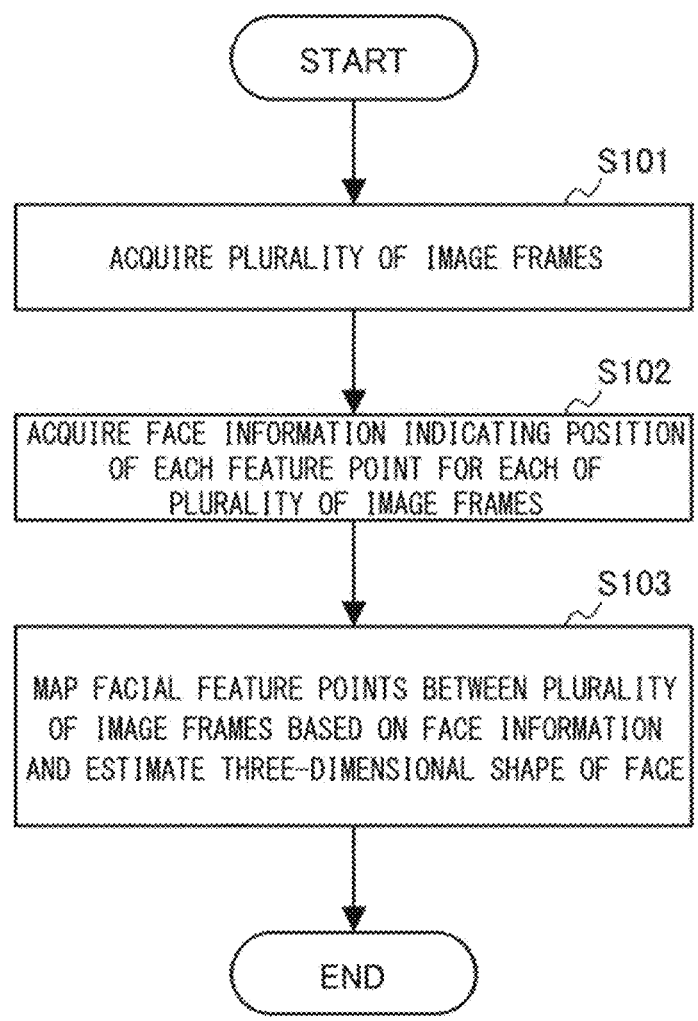
FIG. 5 is a flowchart illustrating an example of a three-dimensional facial shape estimating method performed by the three-dimensional facial shape estimating device according to the first example embodiment.

Next, with reference to FIG. 5, a three-dimensional facial shape estimating method performed by the three-dimensional facial shape estimating device 300 according to the first example embodiment will be described. FIG. 5 is a flowchart illustrating an example of the three-dimensional facial shape estimating method performed by the three-dimensional facial shape estimating device 300 according to the first example embodiment.

As illustrated in FIG. 5, first, the face image acquiring unit 301 acquires a plurality of image frames that capture a subject's face (step S101).

Then, for each of the plurality of image frames acquired by the face image acquiring unit 301, the face information acquiring unit 302 acquires face information indicating the position of each of a predetermined number of facial feature points of the subject's face in the image frame (step S102).

Thereafter, based on the face information, acquired by the face information acquiring unit 302, of each of the plurality of image frames, the three-dimensional shape estimating unit 303 maps each of the predetermined number of facial feature points of the subject's face between the plurality of image frames acquired by the face image acquiring unit 301 and estimates a three-dimensional shape of the subject's face based on the result from the mapping (step S103).

As described above, according to the first example embodiment, for each of a plurality of image frames, the face information acquiring unit 302 acquires face information indicating the position of each of a predetermined number of facial feature points of a subject's face in the image frame. Thus, the three-dimensional shape estimating unit 303 can uniquely map each of the predetermined number of facial feature points of the subject's face between the plurality of image frames based on the face information of each of the plurality of image frames. At this point, no complicated processing is required for mapping. Accordingly, the facial feature points can be mapped between the plurality of image frames more easily and more accurately.

Second Example Embodiment

A second example embodiment gives a more concrete form to the first example embodiment.

Figure 6:
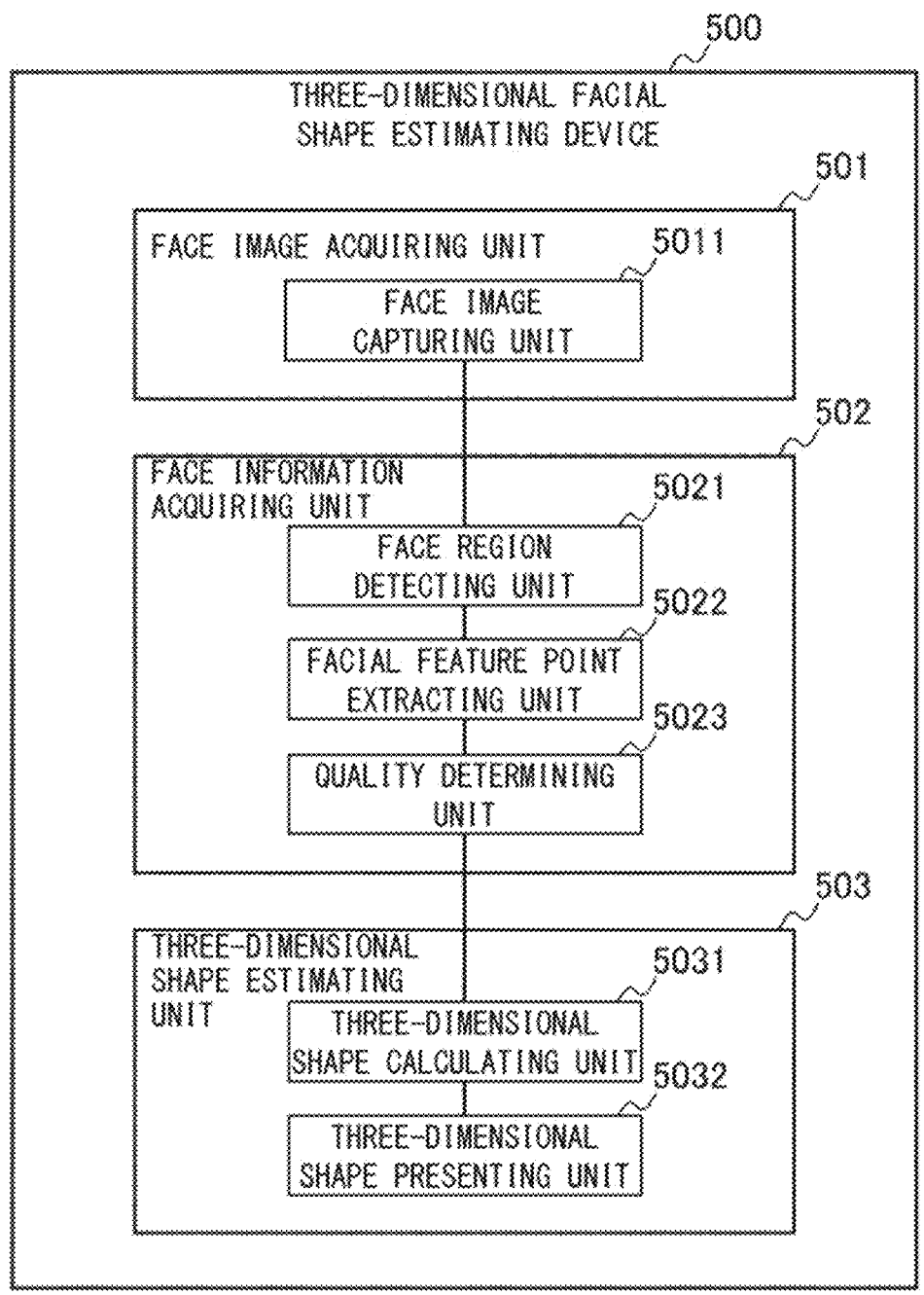
FIG. 6 is a functional block diagram illustrating an example of a functional block configuration of a three-dimensional facial shape estimating device according to a second example embodiment.

First, with reference to FIG. 6, a functional block configuration of a three-dimensional facial shape estimating device 500 according to the second example embodiment will be described. FIG. 6 is a functional block diagram illustrating an example of a functional block configuration of the three-dimensional facial shape estimating device 500 according to the second example embodiment.

As illustrated in FIG. 6, the three-dimensional facial shape estimating device 500 according to the second example embodiment differs from the three-dimensional facial shape estimating device 300 according to the first example embodiment in that the face image acquiring unit 301, the face information acquiring unit 302, and the three-dimensional shape estimating unit 303 are replaced by a face image acquiring unit 501, a face information acquiring unit 502, and a three-dimensional shape estimating unit 503, respectively.

The face image acquiring unit 501 includes a face image capturing unit 5011.

The face image capturing unit 5011 acquires a plurality of image frames captured by a user with an image capturing device and outputs the acquired plurality of image frames to the face information acquiring unit 502. The face image capturing unit 5011 is implemented by an image capturing device, such as a digital camera or a digital video camera, for example. In this example, the face image capturing unit 5011 captures a moving image while changing the relative position of the face image capturing unit 5011 and the subject's face by moving the three-dimensional facial shape estimating device 500 or the subject's face. Thus, the face image capturing unit 5011 acquires a plurality of image frames that capture the subject's face and that are captured from different viewpoints. The plurality of image frames may be a plurality of time-series image frames and may be not a moving image but a still image. Furthermore, the user himself/herself may serve as a subject, or a person other than the user may serve as a subject.

The face information acquiring unit 502 includes a face region detecting unit 5021, a facial feature point extracting unit 5022, and a quality determining unit 5023.

The face region detecting unit 5021 detects a face region within an image frame for each of the plurality of image frames acquired by the face image acquiring unit 501. Then, the face region detecting unit 5021 outputs, to the facial feature point extracting unit 5022, the plurality of image frames each having information on the face region added thereto.

In the facial feature point extracting unit 5022, a predetermined number of facial feature points necessary for estimating a three-dimensional shape of a subject's face are preset. For example, ten facial feature points (1. right eye, 2. left eye, 3. nose, 4. mouth center, 5. mouth right corner, 6. mouth left corner, 7. right cheek, 8. left cheek, 9. right chin, 10. left chin) are preset in the facial feature point extracting unit 5022.

Then, for each of the plurality of image frames acquired by the face image acquiring unit 501, the facial feature point extracting unit 5022 extracts a predetermined number of facial feature points of the subject's face from the face region detected by the face region detecting unit 5021 and acquires face information indicating the position of each of the extracted predetermined number of facial feature points. An example of the face information is summarized in Table 1 above.

The facial feature point extracting unit 5022 also calculates the quality value of each of the predetermined number of facial feature points of the subject's face extracted above. For example, the facial feature point extracting unit 5022 obtains, in advance, a template feature vector that expresses a facial part, such as an eye or a nose, where a facial feature point appears and its vicinity in a feature vector and obtains a feature vector for a facial feature point extracted from an image frame in a similar manner. Then, the facial feature point extracting unit 5022 gives a higher quality value as the similarity between the feature vector of the facial feature point extracted from the image frame and the template feature vector is higher. For example, the facial feature point extracting unit 5022 may measure the distance between feature vectors in the Euclidean distance and give a higher similarity (i.e., a higher quality value) as the Euclidean distance is smaller. Such a method of calculating the quality value based on the Euclidean distance or the like between feature vectors is merely an example and is not a limiting example. The facial feature point extracting unit 5022 then outputs, to the quality determining unit 5023, the plurality of image frames each having the face information and the quality value of each of the predetermined number of facial feature points within the image frame added thereto.

The quality determining unit 5023 evaluates the quality of each of the plurality of image frames acquired by the face image acquiring unit 501. Specifically, for each of the plurality of image frames, the quality determining unit 5023 determines whether the quality value calculated by the facial feature point extracting unit 5022 is no lower than a quality threshold for each of the predetermined number of facial feature points extracted by the facial feature point extracting unit 5022. Then, the quality determining unit 5023 determines that an image frame in which all of the predetermined number of facial feature points within the image frame have a quality value no lower than the quality threshold is a high-quality image frame and discards the remaining image frame(s) so as not to be used by the three-dimensional shape estimating unit 503 in the later stage to estimate the three-dimensional shape of the face.

In the quality determining unit 5023, a predetermined frame count (a frame count of two or more) of image frames necessary for estimating a three-dimensional shape of a subject's face is preset. If the number of image frames, among the plurality of image frames acquired by the face image acquiring unit 501, that are determined to have a high quality falls below the preset predetermined frame count, the quality determining unit 5023 prompts the user to retry to capture an image frame. For example, the quality determining unit 5023 displays, on the display device 4041 (FIG. 4), a message prompting the user to retry to capture an image frame. Then, the quality determining unit 5023 outputs, to the three-dimensional shape estimating unit 503, a plurality of high-quality image frames no less than the predetermined frame count each having the face information added thereto.

The three-dimensional shape estimating unit 503 includes a three-dimensional shape calculating unit 5031 and a three-dimensional shape presenting unit 5032.

The three-dimensional shape calculating unit 5031 performs the following processing with the use of only the image frames, among the plurality of image frames acquired by the face image acquiring unit 501, that are determined to have a high quality by the quality determining unit 5023 and the face information acquired by the facial feature point extracting unit 5022 for those image frames. Specifically, the three-dimensional shape calculating unit 5031 maps each of the predetermined number of facial feature points of the subject's face between the image frames determined to have a high quality based on the face information of each of the image frames determined to have a high quality. Furthermore, the three-dimensional shape calculating unit 5031 estimates the three-dimensional position of the face image capturing unit 5011 and the three-dimensional shape of the subject's face based on the result from the mapping. The three-dimensional shape calculating unit 5031 outputs the estimation result of the three-dimensional shape of the subject's face to the three-dimensional shape presenting unit 5032.

Figure 7:
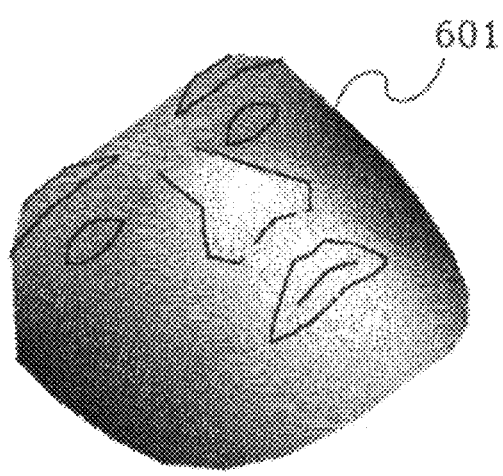
FIG. 7 illustrates an example of an estimation result of a three-dimensional shape of a face.

The three-dimensional shape presenting unit 5032 presents, to the user, the estimation result of the three-dimensional shape of the subject's face estimated by the three-dimensional shape calculating unit 5031. For example, the three-dimensional shape presenting unit 5032 displays the estimation result of the three-dimensional shape of the subject's face on the display device 4041 (FIG. 4). An example of the three-dimensional shape of the subject's face to be presented to the user is illustrated in FIG. 7. In FIG. 7, a three-dimensional shape 601 of the subject's face expresses the face's three-dimensional shape by showing more projecting region in white and a less projecting region in black.

The three-dimensional facial shape estimating device 500 according to the second example embodiment is implemented by the computer 400 having a hardware configuration illustrated in FIG. 4, as in the first example embodiment. The memory 402 or the storage 403 stores programs that implement the functions of the face information acquiring unit 502 and the three-dimensional shape estimating unit 503 of the three-dimensional facial shape estimating device 500. The processor 401 executes these programs to thus implement the respective functions of the face information acquiring unit 502 and the three-dimensional shape estimating unit 503. The processor 401 may provide a display with the use of the display device 4041 when implementing the functions of the quality determining unit 5023 and the three-dimensional shape presenting unit 5032. The image capturing device 4042 implements the function of the face image acquiring unit 501.

Figure 8:
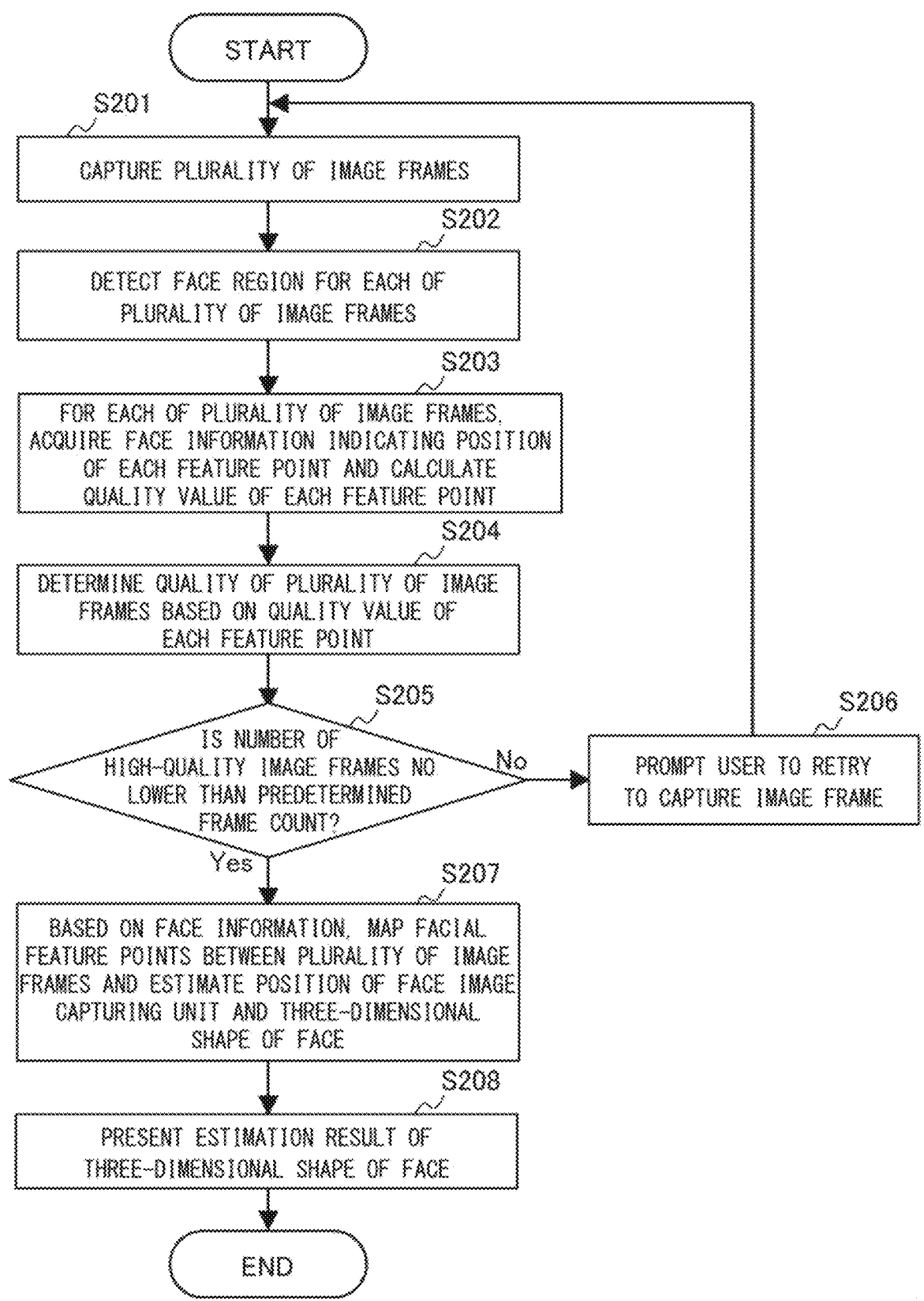
FIG. 8 is a flowchart illustrating an example of a three-dimensional facial shape estimating method performed by the three-dimensional facial shape estimating device according to the second example embodiment.

Next, with reference to FIG. 8, a three-dimensional facial shape estimating method performed by the three-dimensional facial shape estimating device 500 according to the second example embodiment will be described. FIG. 8 is a flowchart illustrating an example of the three-dimensional facial shape estimating method performed by the three-dimensional facial shape estimating device 500 according to the second example embodiment. In this example, ten facial feature points (1. right eye, 2. left eye, 3. nose, 4. mouth center, 5. mouth right corner, 6. mouth left corner, 7. right cheek, 8. left cheek, 9. right chin, 10. left chin) are preset as a predetermined number of facial feature points necessary for estimating a three-dimensional shape of a subject's face. Furthermore, the predetermined frame count of image frames necessary for estimating the three-dimensional shape of the subject's face is preset to five. The duration for which a moving image of a subject's face is captured is preset to three seconds.

As illustrated in FIG. 8, first, the user captures a moving image of a subject's face for three seconds with the face image capturing unit 5011 while the subject moves his/her face to right and left. At this point, if the user himself/herself is the subject, the user captures an image of his/her own face. If the subject is a person other than the user, the user captures the face of the other person. With this operation, a plurality of image frames that capture the subject's face are captured (step S201). In this example, five image frames are acquired.

Then, for each of the five image frames, the face region detecting unit 5021 detects a face region within the image frame (step S202). The face region is detected with the use of the Haar-like feature amount, for example. Detection of a face region with the use of the Haar-like feature amount is disclosed in Non-Patent Literature 1 (P. Viola and M. Jones, "Rapid Object Detection Using a Boosted Cascade of Simple Features," Proceedings of the 2001 IEEE Computer Society Conference on Computer Vision and Pattern Recognition (CVPR), Vol. 1, 2001, pp. 511-518), for example.

Then, for each of the five image frames, the facial feature point extracting unit 5022 extracts ten facial feature points of the subject's face from the face region detected by the face region detecting unit 5021 and acquires face information indicating the position of each of the extracted ten facial feature points. As a result, a total of fifty facial feature points are defined in the five image frames. The facial feature point extracting unit 5022 further calculates the quality value (e.g., the quality value that is based on the Euclidean distance or the like between feature vectors described above) of each of the predetermined number of facial feature points of the subject's face extracted above (step S203). The facial feature points are extracted with the use of the histogram of oriented gradient (HOG) feature amount, for example. Detection of a face region with the use of the HOG feature amount is disclosed in Non-Patent Literature 2 (H.-C. Choi, D. Sibbing, and L. Kobbelt, "Nonparametric Facial Feature Localization Using Segment-Based Eigenfeatures," Computational Intelligence and Neuroscience, vol. 2016, pp. 1-11, 2016), for example.

In step S203, for example, the facial feature point extracting unit 5022 extracts the ten facial feature points with the use of a classifier. For example, this classifier selects, from ten or more (e.g., about one hundred) facial feature points present in the face region, a facial feature point that is most likely a right eye, a facial feature point that is most likely a left eye, . . . , and a facial feature point that is most likely a left chin to thus select the ten facial feature points. The facial feature point extracting unit 5022 discards the facial feature points other than the ten facial feature points extracted from the facial feature points present in the face region. At this point, the facial feature point extracting unit 5022 may determine a facial feature point that is most likely a right eye and so on based on the quality value described above. Therefore, the quality value of each facial feature point may have been calculated before the facial feature point is extracted.

Thereafter, for each of the five image frames, the quality determining unit 5023 determines whether the quality value of each of the ten facial feature points within the image frame is no lower than the quality threshold and determines that an image frame in which all of the ten facial feature points within the image frame have a quality value no lower than the quality threshold is a high-quality image frame (step S204). At this point, the quality determining unit 5023 discards an image frame that has failed to be determined to have a high quality.

In this manner, in the second example embodiment, although the facial feature point extracting unit 5022 still extracts most-likely facial feature points from even an image frame that actually fails to capture some of the predetermined number of facial feature points, the quality determining unit 5023 determines that the quality of these facial feature points is low and discards the image frame. Meanwhile, for an image frame that clearly captures a predetermined number of facial feature points, even if the image frame contains blurring, bokeh, white clipping, black clipping, or the like, the facial feature point extracting unit 5022 extracts a predetermined number of facial feature points, the quality determining unit 5023 determines that the facial feature points have a high quality, and the image frame is used for estimating the three-dimensional shape of the face in the later stage.

Next, the quality determining unit 5023 determines whether there are five or more high-quality image frames (step S205). If there are less than five high-quality image frames (No in step S205), the quality determining unit 5023 prompts the user to retry to capture an image frame (step S206). Thereafter, the processing returns to step S201.

Meanwhile, if there are five or more high-quality image frames (Yes in step S205), the processing proceeds to step S207. The following description assumes that the five image frames captured in step S201 all have a high quality and the processing proceeds to step S207.

Then, the three-dimensional shape calculating unit 5031 maps each of the ten facial feature points of the subject's face between the five image frames based on the face information of each of the five image frames. Furthermore, the three-dimensional shape calculating unit 5031 estimates the three-dimensional position of the face image capturing unit 5011 held when each of the five image frames is captured and estimates the three-dimensional shape of the subject's face based on the result from the mapping. The three-dimensional position of the face image capturing unit 5011 and the three-dimensional shape of the subject's face are estimated with the use of the bundle adjustment technique, for example. Estimation of a three-dimensional position of a camera and a three-dimensional shape of a subject's face with the use of the bundle adjustment technique are disclosed in Non-Patent Literature 3 (B. Triggs, A. Zisserman, and R. Szeliski, Eds., Bundle Adjustment—A Modern Synthesis, vol. 1883. Berlin, Heidelberg: Springer Berlin Heidelberg, 2000), for example.

In the bundle adjustment technique, the three-dimensional position of a camera held when each of a plurality of image frames is captured and a three-dimensional shape of a target subject are calculated based on a movement of the target subject included in the plurality of image frames.

In this example, when the position of the face image capturing unit 5011 is defined by six parameters—spatial positions (x, y, z) and angles of rotation ($\theta$, $\varphi$, $\psi$), a total of 5×6=30 parameters are required for the five image frames. In addition, when the three-dimensional coordinates of each of the ten facial feature points are defined by three parameters—spatial positions (x, y, z), a total of 10×3=30 parameters are required. Accordingly, a total of 60 parameters are determined.

To determine the parameters, the reprojection error is minimized. The reprojection error is an error between the two-dimensional position of a facial feature point, of a face located in a three-dimensional space, that appears in an actually captured image frame and the two-dimensional position of the facial feature point obtained when the facial feature point is reprojected onto a screen captured by the face image capturing unit 5011 that has captured each image frame with the use of parameters of the face image capturing unit 5011 held when each image frame has been captured. The reprojection error is expressed by the following expression 1.

$$E(C, P) = \frac{1}{2}\sum_{i,j}[(x_{i,j} - f_x(c_i, p_j))^2 + (y_{i,j} - f_y(c_i, p_j))^2] \quad \text{[Math 1]}$$

In the above expression 1, $c_i$ is a vector (i=1, 2, 3, 4, 5) in which the parameters of the face image capturing unit 5011 held when an ith image frame has been captured are arrayed, $p_j$ is a vector (j=1, 2, ..., 10) in which the three-dimensional coordinates of a jth facial feature point are arrayed, and C and P are matrices in which, respectively, $c_i$ and $p_j$ are arrayed. Furthermore, $x_{i,j}$ and $y_{i,j}$ represent, respectively, the x and y coordinates of the jth facial feature point within the ith image frame that has actually been captured. Furthermore, $f_x$ and $f_y$ are projection functions held when the three-dimensional coordinates are projected to, respectively, the two-dimensional x-coordinate and the two-dimensional y-coordinate. The purpose of the expression 1 is to obtain $c_i$, which is the three-dimensional position of the face image capturing unit 5011, and $p_j$, which is the three-dimensional coordinates of a facial feature point. Initially, there is a large reprojection error since $c_i$ and $p_j$ are unknown. However, recursively reducing the error makes it possible to calculate the three-dimensional coordinates $p_j$ of the facial feature point accurately, that is, to calculate the three-dimensional shape of the face.

Thereafter, the three-dimensional shape presenting unit 5032 presents the three-dimensional shape of the subject's face calculated by the three-dimensional shape calculating unit 5031 to the user as the estimation result of the three-dimensional shape of the subject's face (step S208). Thus, the processing is terminated.

As described above, according to the second example embodiment, for each of a plurality of image frames, the face information acquiring unit 502 acquires face information indicating the position of each of a predetermined number of facial feature points of a subject's face in the image frame. Thus, the three-dimensional shape estimating unit 503 can uniquely map each of the predetermined number of facial feature points of the subject's face between the plurality of image frames based on the face information of each of the plurality of image frames. This renders any complicated processing unnecessary for mapping. Accordingly, the facial feature points can be mapped between the plurality of image frames more easily and more accurately.

According to the second example embodiment, even when blurring, bokeh, white clipping, black clipping, or the like occurs in an image frame because of an influence of a camera shake, an illumination variation, or the like held when the image frame is captured, as long as a predetermined number of facial feature points can be extracted, the three-dimensional shape estimating unit 503 can map the facial feature points between a plurality of image frames and estimate a three-dimensional shape of the subject's face. Therefore, even when a camera shake, an illumination variation, or the like occurs, the three-dimensional shape of the subject's face can be estimated stably.

According to the second example embodiment, for each of a plurality of image frames, the face information acquiring unit 502 calculates the quality value of each of a predetermined number of facial feature points of a subject's face within the image frame and determines a high-quality image frame based on the calculated quality value. Then, based on the face information of each of the image frames, among the plurality of image frames, that are determined to have a high quality, the three-dimensional shape estimating unit 503 maps each of the predetermined number of facial feature points of the subject's face between the image frames that are determined to have a high quality. Accordingly, the three-dimensional shape estimating unit 503 can estimate the three-dimensional shape of the subject's face with any image frame determined not to have a high quality excluded, and this makes it possible to improve the estimation accuracy.

According to the second example embodiment, when the number of image frames, among the plurality of image frames, that are determined to have a high quality falls below a preset predetermined frame count, the face information acquiring unit 502 prompts the user to retry to capture an image frame that captures the subject's face. Accordingly, the three-dimensional shape estimating unit 503 can estimate the three-dimensional shape of the subject's face with the use of image frames no less than the predetermined frame count, and this can keep the estimation accuracy from decreasing, which could occur when the number of image frames is small.

Thus far, the present disclosure has been described with reference to the example embodiments, but the present disclosure is not limited by the foregoing. Various modifications that a person skilled in the art can appreciate within the scope of the disclosure can be made to the configurations and the details of the present disclosure.

For example, in the foregoing second example embodiment, the facial feature point extracting unit 5022 calculates the quality value of a facial feature point, and the quality determining unit 5023 determines whether the quality value of the facial feature point is no lower than the quality threshold. This, however, is not a limiting example. The quality value of a facial feature point may be calculated instead by the quality determining unit 5023.

In the foregoing second example embodiment, in the face information acquiring unit 502, the number of facial feature points and the number of image frames necessary for estimating a three-dimensional shape of a subject's face are preset to ten and five, respectively, and the duration for capturing a moving image of the subject's face is preset to three seconds. These settings, however, may be changeable. For example, the face information acquiring unit 502 may change the settings to values that the user inputs via the input device 4043 (FIG. 4). For example, when the user wants to improve the estimation accuracy of a three-dimensional shape of a subject's face, it is conceivable to increase the number of facial feature points and/or the frame count of the image frames.

In the foregoing second example embodiment, a moving image of a subject's face is captured while the subject moves his/her face to right and left. At this point, a captured image frame needs to capture a predetermined number of facial feature points, and to that end, it is preferable that the subject do not move his/her face too much. Therefore, the subject may be prompted to move his/her face slightly while an image is being captured. In this case, the face image acquiring unit 501 may display a message prompting the subject to move his/her face slightly on the display device 4041 (FIG. 4), for example.

A part or whole of the foregoing example embodiments can also be expressed as in the following supplementary notes, but the following are not limiting.

(Supplementary Note 1)

A three-dimensional facial shape estimating device comprising:
  a face image acquiring unit configured to acquire a plurality of image frames that capture a subject's face;
  a face information acquiring unit having, preset therein, a predetermined number of facial feature points necessary for estimating a three-dimensional shape of the subject's face, the face information acquiring unit being configured to acquire, for each of the plurality of image frames, face information that indicates a position of each of the predetermined number of facial feature points of the subject's face within the image frame; and
  a three-dimensional shape estimating unit configured to perform mapping of each of the predetermined number of facial feature points of the subject's face between the plurality of image frames based on the face information of each of the plurality of image frames and to estimate the three-dimensional shape of the subject's face based on a result from the mapping.

(Supplementary Note 2)

The three-dimensional facial shape estimating device according to Supplementary Note 1, wherein
  the face information acquiring unit is configured to
    calculate, for each of the plurality of image frames, a quality value of each of the predetermined number of facial feature points of the subject's face within the image frame, and
    determine that an image frame in which all of the predetermined number of facial feature points have a quality value no lower than a quality threshold is a high-quality image frame, and
  the three-dimensional shape estimating unit is configured to
    perform, based on the face information of each of image frames, among the plurality of image frames, that are determined to have a high quality, mapping of each of the predetermined number of facial feature points of the subject's face between the image frames, among the plurality of image frames, that are determined to have a high quality, and
    estimate the three-dimensional shape of the subject's face based on a result from the mapping.

(Supplementary Note 3)

The three-dimensional facial shape estimating device according to Supplementary Note 2, wherein
  the face image acquiring unit is an image capturing device that acquires an image frame captured by a user, and
  the face information acquiring unit is configured to prompt the user to retry to capture an image frame that captures the subject's face if the number of the image frames, among the plurality of image frames, that are determined to have a high quality falls below a preset predetermined frame count.

(Supplementary Note 4)

The three-dimensional facial shape estimating device according to any one of Supplementary Notes 1 to 3, wherein the face information acquiring unit is configured to be capable of changing a setting of the predetermined number of facial feature points.

(Supplementary Note 5)

The three-dimensional facial shape estimating device according to Supplementary Note 3, wherein the face information acquiring unit is configured to be capable of changing a setting of the predetermined frame count of the image frames.

(Supplementary Note 6)

A three-dimensional facial shape estimating method performed by a three-dimensional facial shape estimating device, the three-dimensional facial shape estimating method comprising:
  a face image acquiring step of acquiring a plurality of image frames that capture a subject's face;
  a face information acquiring step of, with a predetermined number of facial feature points necessary for estimating a three-dimensional shape of the subject's face preset, acquiring, for each of the plurality of image frames, face information that indicates a position of each of the predetermined number of facial feature points of the subject's face within the image frame; and
  a three-dimensional shape estimating step of performing mapping of each of the predetermined number of facial feature points of the subject's face between the plurality of image frames based on the face information of each of the plurality of image frames and estimating the three-dimensional shape of the subject's face based on a result from the mapping.

(Supplementary Note 7)

The three-dimensional facial shape estimating method according to Supplementary Note 6, wherein the face information acquiring step includes calculating, for each of the plurality of image frames, a quality value of each of the predetermined number of facial feature points of the subject's face within the image frame, and determining that an image frame in which all of the predetermined number of facial feature points have a quality value no lower than a quality threshold is a high-quality image frame, and the three-dimensional shape estimating step includes performing, based on the face information of each of image frames, among the plurality of image frames, that are determined to have a high quality, mapping of each of the predetermined number of facial feature points of the subject's face between the image frames, among the plurality of image frames, that are determined to have a high quality, and estimating the three-dimensional shape of the subject's face based on a result from the mapping.

(Supplementary Note 8)

The three-dimensional facial shape estimating method according to Supplementary Note 7, wherein the face image acquiring step includes acquiring an image frame captured by a user, and the face information acquiring step includes prompting the user to retry to capture an image frame that captures the subject's face if the number of the image frames, among the plurality of image frames, that are determined to have a high quality falls below a preset predetermined frame count.

(Supplementary Note 9)

The three-dimensional facial shape estimating method according to any one of Supplementary Notes 6 to 8, wherein, in the face information acquiring step, a setting of the predetermined number of facial feature points can be changed.

(Supplementary Note 10)

The three-dimensional facial shape estimating method according to Supplementary Note 8, wherein, in the face information acquiring step, a setting of the predetermined frame count of the image frames can be changed.

(Supplementary Note 11)

A non-transitory computer-readable medium storing a three-dimensional facial shape estimating program for causing a computer to execute:

a face image acquiring procedure of acquiring a plurality of image frames that capture a subject's face;

a face information acquiring procedure of, with a predetermined number of facial feature points necessary for estimating a three-dimensional shape of the subject's face preset, acquiring, for each of the plurality of image frames, face information that indicates a position of each of the predetermined number of facial feature points of the subject's face within the image frame; and a three-dimensional shape estimating procedure of performing mapping of each of the predetermined number of facial feature points of the subject's face between the plurality of image frames based on the face information of each of the plurality of image frames and estimating the three-dimensional shape of the subject's face based on a result from the mapping.

(Supplementary Note 12)

The non-transitory computer-readable medium according to Supplementary Note 11, wherein the face information acquiring procedure includes calculating, for each of the plurality of image frames, a quality value of each of the predetermined number of facial feature points of the subject's face within the image frame, and determining that an image frame in which all of the predetermined number of facial feature points have a quality value no lower than a quality threshold is a high-quality image frame, and the three-dimensional shape estimating procedure includes performing, based on the face information of each of image frames, among the plurality of image frames, that are determined to have a high quality, mapping of each of the predetermined number of facial feature points of the subject's face between the image frames, among the plurality of image frames, that are determined to have a high quality, and estimating the three-dimensional shape of the subject's face based on a result from the mapping.

(Supplementary Note 13)

The non-transitory computer-readable medium according to Supplementary Note 12, wherein the face image acquiring procedure includes acquiring an image frame captured by a user, and the face information acquiring procedure includes prompting the user to retry to capture an image frame that captures the subject's face if the number of the image frames, among the plurality of image frames, that are determined to have a high quality falls below a preset predetermined frame count.

(Supplementary Note 14)

The non-transitory computer-readable medium according to any one of Supplementary Notes 11 to 13, wherein, in the face information acquiring procedure, a setting of the predetermined number of facial feature points can be changed.

(Supplementary Note 15)

The non-transitory computer-readable medium according to Supplementary Note 13, wherein, in the face information acquiring procedure, a setting of the predetermined frame count of the image frames can be changed.

This application claims priority to Japanese Patent Application No. 2017-203669, filed on Oct. 20, 2017, the entire disclosure of which is incorporated herein.

REFERENCE SIGNS LIST

201 FACIAL FEATURE POINT
202, 203 IMAGE FRAME
300 THREE-DIMENSIONAL FACIAL SHAPE ESTIMATING DEVICE
301 FACE IMAGE ACQUIRING UNIT
302 FACE INFORMATION ACQUIRING UNIT
303 THREE-DIMENSIONAL SHAPE ESTIMATING UNIT
400 COMPUTER
401 PROCESSOR
402 MEMORY
403 STORAGE
404 INPUT/OUTPUT INTERFACE (INPUT/OUTPUT I/F)
4041 DISPLAY DEVICE
4042 IMAGE CAPTURING DEVICE
4043 INPUT DEVICE

405 COMMUNICATION INTERFACE (COMMUNICATION I/F)
500 THREE-DIMENSIONAL FACIAL SHAPE ESTIMATING DEVICE
501 FACE IMAGE ACQUIRING UNIT
5011 FACE IMAGE CAPTURING UNIT
502 FACE INFORMATION ACQUIRING UNIT
5021 FACE REGION DETECTING UNIT
5022 FACIAL FEATURE POINT EXTRACTING UNIT
5023 QUALITY DETERMINING UNIT
503 THREE-DIMENSIONAL SHAPE ESTIMATING UNIT
5031 THREE-DIMENSIONAL SHAPE CALCULATING UNIT
5032 THREE-DIMENSIONAL SHAPE PRESENTING UNIT
601 THREE-DIMENSIONAL SHAPE OF FACE

The invention claimed is:

1. A three-dimensional facial shape estimating device comprising:
at least one memory configured to store instructions; and
at least one processor configured to execute the instructions to:
acquire a plurality of image frames that capture a subject's face;
store a predetermined number of facial feature points necessary for estimating a three-dimensional shape of the subject's face, acquire, for each of the plurality of image frames, face information that indicates a position of each of the predetermined number of facial feature points of the subject's face within the image frame;
perform mapping of each of the predetermined number of facial feature points of the subject's face between the plurality of image frames based on the face information of each of the plurality of image frames;
calculate, for each of the plurality of image frames, a quality value of each of the predetermined number of facial feature points of the subject's face within the image frame, based on feature vectors of the facial feature points;
determine that an image frame in which all of the predetermined number of facial feature points have a quality value no lower than a quality threshold is a high-quality image frame;
perform, based on the face information of each of image frames, among the plurality of image frames, that are determined to have a high quality, mapping of each of the predetermined number of facial feature points of the subject's face between the image frames, among the plurality of image frames, that are determined to have a high quality; and
estimate the three-dimensional shape of the subject's face based on a result from the mapping.

2. The three-dimensional facial shape estimating device according to claim 1, wherein
the at least one processor is configured to execute the instructions to
prompt a user to retry to capture an image frame that captures the subject's face if the number of the image frames, among the plurality of image frames, that are determined to have a high quality falls below a preset predetermined frame count.

3. The three-dimensional facial shape estimating device according to claim 2, wherein the face information acquiring unit is configured to be capable of changing a setting of the predetermined frame count of the image frames.

4. The three-dimensional facial shape estimating device according to claim 1, wherein the face information acquiring unit is configured to be capable of changing a setting of the predetermined number of facial feature points.

5. The three-dimensional facial shape estimating device according to claim 1, wherein
the at least one processor is configured to execute the instructions to calculate the quality value of each of the predetermined number of facial feature points, by comparing a first feature vector of one of the facial feature points with a second feature vector, and
the first feature vector and the second feature vector are of the feature vectors.

6. A three-dimensional facial shape estimating method performed by a three-dimensional facial shape estimating device, the three-dimensional facial shape estimating method comprising:
a face image acquiring step of acquiring a plurality of image frames that capture a subject's face;
a face information acquiring step of, with a predetermined number of facial feature points necessary for estimating a three-dimensional shape of the subject's face preset, acquiring, for each of the plurality of image frames, face information that indicates a position of each of the predetermined number of facial feature points of the subject's face within the image frame; and
a three-dimensional shape estimating step of performing mapping of each of the predetermined number of facial feature points of the subject's face between the plurality of image frames based on the face information of each of the plurality of image frames and estimating the three-dimensional shape of the subject's face based on a result from the mapping;
wherein the face information acquiring step includes:
calculating, for each of the plurality of image frames, a quality value of each of the predetermined number of facial feature points of the subject's face within the image frame, based on feature vectors of the facial feature points, and
determining that an image frame in which all of the predetermined number of facial feature points have a quality value no lower than a quality threshold is a high-quality image frame, and
wherein the three-dimensional shape estimating step includes:
performing, based on the face information of each of image frames, among the plurality of image frames, that are determined to have a high quality, mapping of each of the predetermined number of facial feature points of the subject's face between the image frames, among the plurality of image frames, that are determined to have a high quality, and
estimating the three-dimensional shape of the subject's face based on a result from the mapping.

7. The three-dimensional facial shape estimating method according to claim 6, wherein
the face information acquiring step includes prompting a user to retry to capture an image frame that captures the subject's face if the number of the image frames, among the plurality of image frames, that are determined to have a high quality falls below a preset predetermined frame count.

8. A non-transitory computer-readable medium storing a three-dimensional facial shape estimating program for causing a computer to execute:
a face image acquiring procedure of acquiring a plurality of image frames that capture a subject's face;

a face information acquiring procedure of, with a predetermined number of facial feature points necessary for estimating a three-dimensional shape of the subject's face preset, acquiring, for each of the plurality of image frames, face information that indicates a position of each of the predetermined number of facial feature points of the subject's face within the image frame; and a three-dimensional shape estimating procedure of performing mapping of each of the predetermined number of facial feature points of the subject's face between the plurality of image frames based on the face information of each of the plurality of image frames and estimating the three-dimensional shape of the subject's face based on a result from the mapping, wherein the face information acquiring procedure includes:

calculating, for each of the plurality of image frames, a quality value of each of the predetermined number of facial feature points of the subject's face within the image frame, based on feature vectors of the facial feature points, and determining that an image frame in which all of the predetermined number of facial feature points have a quality value no lower than a quality threshold is a high-quality image frame, and wherein the three-dimensional shape estimating procedure includes:

performing, based on the face information of each of image frames, among the plurality of image frames, that are determined to have a high quality, mapping of each of the predetermined number of facial feature points of the subject's face between the image frames, among the plurality of image frames, that are determined to have a high quality, and estimating the three-dimensional shape of the subject's face based on a result from the mapping.

\* \* \* \* \*